(12) United States Patent
Patel et al.

(10) Patent No.: US 11,863,287 B2
(45) Date of Patent: *Jan. 2, 2024

(54) PRE-AMPLIFIER FOR A MODEM

(71) Applicant: Wilson Electronics, LLC, St. George, UT (US)

(72) Inventors: Ilesh V. Patel, Euless, TX (US); Christopher Ken Ashworth, Toquerville, UT (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,415

(22) Filed: Jun. 14, 2022

(65) Prior Publication Data

US 2022/0311504 A1    Sep. 29, 2022

Related U.S. Application Data

(63) Continuation of application No. 17/365,914, filed on Jul. 1, 2021, now Pat. No. 11,362,729.
(Continued)

(51) Int. Cl.
*H04B 7/155* (2006.01)
*H04B 1/00* (2006.01)
(Continued)

(52) U.S. Cl.
CPC ....... *H04B 7/15528* (2013.01); *H04B 1/0096* (2013.01); *H04L 27/0002* (2013.01); *H04W 88/06* (2013.01)

(58) Field of Classification Search
CPC .............. H04B 7/15528; H04B 1/0096; H04B 7/15542; H04W 88/06; H04W 16/26; H04W 88/04; H04L 27/0002
See application file for complete search history.

(56) References Cited

U.S. PATENT DOCUMENTS 4,776,032 A   10/1988   Odate et al.
5,303,395 A    4/1994   Dayani
(Continued)

FOREIGN PATENT DOCUMENTS

EP    1525678 B1    7/2008
EP    2802090 A1   12/2014

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.
(Continued)

*Primary Examiner* — Keith Ferguson
(74) *Attorney, Agent, or Firm* — Thorpe North & Western, LLP

(57) ABSTRACT

Technology for a pre-amplification system for a modem is disclosed. The pre-amplification system can include an uplink-downlink signal path communicatively coupled between a first modem port of the modem and a first donor antenna port. The pre-amplification system can include a downlink signal path communicatively coupled between a second modem port of the modem and a second donor antenna port. The downlink signal path can include a pre-amplifier configured to amplify a received downlink cellular signal to produce an amplified downlink cellular signal to be directed to the second modem port.

20 Claims, 7 Drawing Sheets

Related U.S. Application Data

(60) Provisional application No. 63/047,186, filed on Jul. 1, 2020.

(51) Int. Cl.
*H04L 27/00* (2006.01)
*H04W 88/06* (2009.01)

(56) References Cited

U.S. PATENT DOCUMENTS

| | | |
|---|---|---|
| 5,737,687 A | 4/1998 | Martin et al. |
| 5,777,530 A | 7/1998 | Nakatuka |
| 5,835,848 A | 11/1998 | Bi et al. |
| 6,005,884 A | 12/1999 | Cook et al. |
| 6,711,388 B1 | 3/2004 | Neitiniemi |
| 6,889,033 B2 | 5/2005 | Bongfeldt |
| 6,990,313 B1 | 1/2006 | Yarkosky |
| 7,035,587 B1 | 4/2006 | Yarkosky |
| 7,221,967 B2 | 5/2007 | Van Buren et al. |
| 7,974,573 B2 | 7/2011 | Dean |
| 2004/0146013 A1 | 6/2004 | Song et al. |
| 2008/0081555 A1 | 4/2008 | Kong et al. |
| 2008/0096483 A1 | 4/2008 | Van Buren et al. |
| 2008/0278237 A1 | 11/2008 | Blin |
| 2009/0285147 A1 | 11/2009 | Subasic et al. |
| 2010/0248616 A1 | 9/2010 | Fredrick |
| 2011/0151775 A1 | 6/2011 | Kang et al. |
| 2017/0288766 A1 | 10/2017 | Cook et al. |
| 2019/0196555 A1 | 6/2019 | Mouser et al. |
| 2019/0327625 A1 | 10/2019 | Patel et al. |
| 2020/0252088 A1* | 8/2020 | Jacobs .................. H04B 1/005 |

OTHER PUBLICATIONS

ADL5513; "1 MHZ to 4 GHZ, 80 dB Logarithmic Detector/Controller"; Data Sheet; (2008); 12 pages; Analog Devices, Inc.

HMC713LP3E; "54 dB, Logarithmic Detector / Controller, 50-8000 MHz"; Data Sheet; (2010); 12 pages.

HMC909LP4E; "RMS Power Detector Single-Ended, DC-5.8 GHz"; Data Sheet; (2010); 21 pages.

PIC16F873; "28/40-Pin 8-Bit CMOS Flash Microcontrollers"; (2001); Data Sheet; 218 pages.

* cited by examiner

PRE-AMPLIFIER FOR A MODEM

RELATED APPLICATIONS

The present application is a continuation of U.S. patent application Ser. No. 17/365,914 filed Jul. 1, 2021, which claims the benefit of U.S. Provisional Patent Application No. 63/047,186 filed Jul. 1, 2020, the entire specifications of which are hereby incorporated by reference in their entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
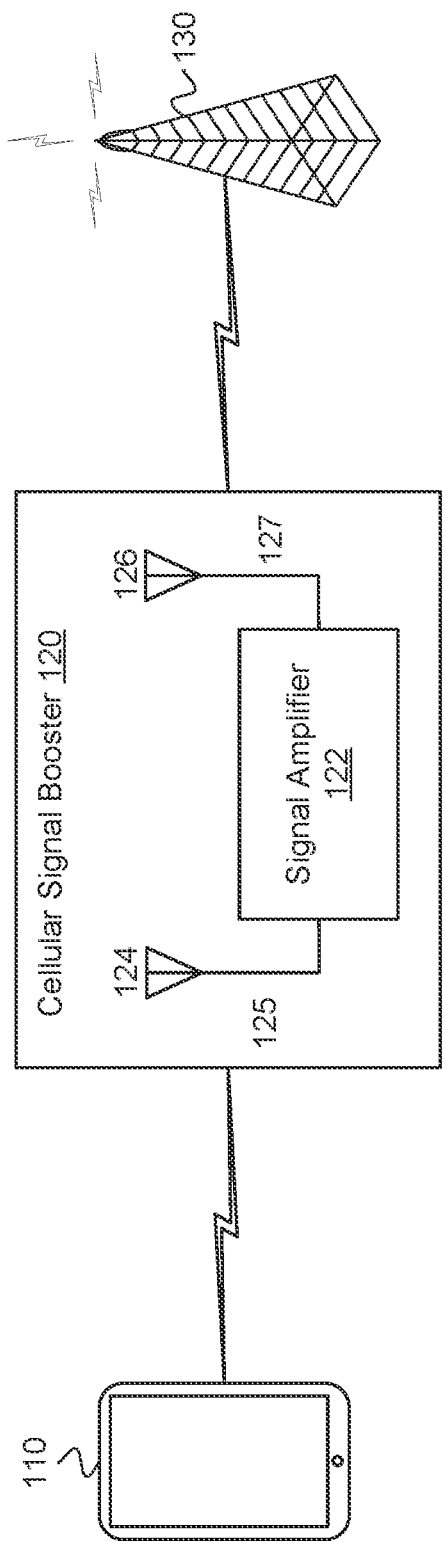
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, 13, 14, 15, or 16, 3GPP 5G Release 15 or 16, or Institute of Electronics and Electrical Engineers (IEEE) 802.16. In one configuration, the repeater 220 can boost signals for 3GPP LTE Release 16.0.0 (January 2019) or other desired releases. The signal booster 120 can boost signals from the 3GPP Technical Specification (TS) 36.101 (Release 15 Sep. 2017) bands or LTE frequency bands. For example, the signal booster 120 can boost signals from the LTE frequency bands: 2, 4, 5, 12, 13, 17, 25, and 26. In addition, the signal booster 120 can boost selected frequency bands based on the country or region in which the signal booster is used, including any of bands 1-85 or other bands, as disclosed in 3GPP TS 36.104 V16.0.0 (January 2019).

In another configuration, the repeater 220 can boost signals from the 3GPP Technical Specification (TS) 38.104 (Release 15 Jan. 2019) bands or 5G frequency bands. In addition, the repeater 220 can boost selected frequency bands based on the country or region in which the repeater is used, including any of bands n1-n86, n257-n261, or other bands, as disclosed in 3GPP TS 38.104 V15.4.0 (January 2019).

The number of 3GPP LTE or 5G frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 decibel-milliwatts (dBm). The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

Figure 2:
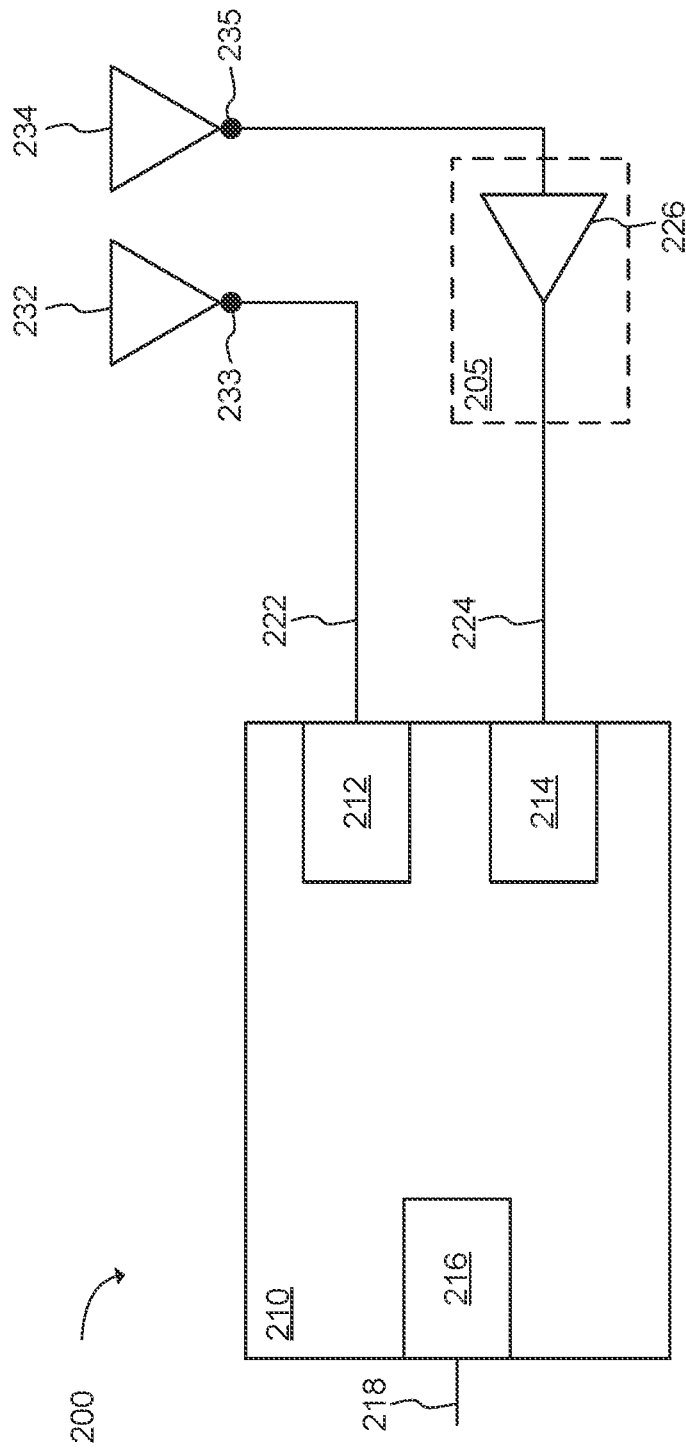
FIG. 2 illustrates a diagram of a repeater that includes a pre-amplification system for a modem in accordance with an example.

FIG. 2 illustrates an example diagram of a repeater 200 that includes a pre-amplification system 205 for a modem 210 (or modem module). The repeater 200 (or signal booster) can be a cellular repeater. The pre-amplification system 205 can receive a downlink signal on a downlink signal path. The downlink signal can be a downlink cellular signal. The pre-amplification system 205 can include a pre-amplifier 226 to amplify the downlink signal to produce an amplified downlink signal. The pre-amplifier 226 can be a low noise amplifier (LNA) or another type of amplifier. The pre-amplifier 226 can be a low-gain and wideband amplifier, as the pre-amplifier 226 can cover all of the cellular bands amplified by the repeater 200. The pre-amplification system 205 can provide the amplified downlink signal to the modem 210. In other words, the pre-amplification system 205 can be responsible for downlink signal amplification prior to or before a downlink signal reaches the modem 210.

In one example, the modem 210 (or modem module) can include an amplifier, such as a low noise amplifier (LNA). The amplifier included in the modem 210 (or modem module) can be separate from the pre-amplifier 226. In other words, the pre-amplifier 226 can be outside the modem 210 (or modem module).

In one example, the pre-amplification system 205 can be considered a pre-amplifier for the modem 210 because the pre-amplification system 205 can amplify a downlink (DL) signal before the downlink signal is received at the modem 210. An amplifier on a DL-only port won't violate the modem's government certification, such as a certification by the federal communication commission (FCC). Amplifying the uplink (UL) output from the modem would violate the modem's government certification. Signals going to a modem's UL/DL port can't be amplified without separating the UL and DL signals, which would add so much insertion loss that it wouldn't be worthwhile. However, using a pre-amplifier on a DL only port can improve the downlink signal without violating the modem's government certification. Therefore, the pre-amplification system 205 can serve to improve a performance of the modem 210.

Further, as described in further detail below, the downlink signal path can be communicatively coupled to a diversity donor antenna. In one example, downlink signal amplification for the downlink signal path that is coupled to the diversity donor antenna, as performed by the pre-amplification system 205, can provide about 3 dB of increased receiver sensitivity, thereby allowing a higher data throughput via an Ethernet port 216 of the modem 210. In other words, this additional 3 dB of receiver sensitivity can result in the higher data throughput via the Ethernet port 216 of the modem 210. The increased receiver sensitivity can be particularly useful when the repeater 200 is used in a rural geographical area with poor cellular reception.

In one example, the modem 210 can include a first modem port 212, a second modem port 214 and the Ethernet port 216. The first modem port 212 can be an uplink-downlink modem port. The second modem port 214 can be a downlink-only modem port. The Ethernet port 216 can be communicatively coupled to a coaxial cable 218. In an alternative configuration, the modem 210 may not include an Ethernet port, but rather a port for an optical fiber cable or another suitable port for a specific type of cable.

In one example, the modem 210 can receive a downlink signal via the first modem port 212 and/or the second modem port 214. The modem 210 can modify the downlink signal (e.g., amplify and/or filter the downlink signal) to produce a modified downlink signal. The modem 210 can direct the modified downlink signal to the coaxial cable 218 via the Ethernet port 216. Similarly, the modem 210 can receive an uplink signal through the coaxial cable 218 via the Ethernet port 216. The modem 210 can modify the uplink signal (e.g., amplify and/or filter the uplink signal) to produce a modified uplink signal. The modem 210 can direct the modified uplink signal to the first modem port 212 and/or the second modem port 214.

In one example, the repeater 200 can include a first donor antenna port 233 and a second donor antenna port 235. The first donor antenna port 233 can be communicatively coupled to a first donor antenna 232, and the second donor antenna port 235 can be communicatively coupled to a second donor antenna 234. In one example, the first donor antenna 232 can be a main donor antenna, and the second donor antenna 234 can be a diversity donor antenna. Similarly, the first donor antenna port 233 can be a main donor antenna port, and the second donor antenna port 235 can be a diversity donor antenna port. In one example, the first donor antenna 232 can be an uplink-downlink antenna, and the second donor antenna 234 can be a downlink-only antenna. In other words, the first donor antenna 232 can be capable of transmitting uplink signals and receiving downlink signals, whereas the second donor antenna 234 can be capable of only receiving downlink signals. Further, the first donor antenna 232 and the second donor antenna 234 can achieve antenna diversity using spatial diversity, pattern diversity, polarization diversity, etc. For example, the first donor antenna 232 and the second donor antenna 234 can be cross polarized antennas.

In one example, the first donor antenna 232 and the second donor antenna 234 can be configured to receive and/or transmit signals in the same set of bands. In one specific example, the second donor antenna 234 (e.g., the downlink-only donor antenna) can be configured to only accommodate downlink frequencies.

In one example, the repeater 200 can include a first signal path 222 communicatively coupled between the first donor antenna port 233 and the first modem port 212. The first signal path 222 can be an uplink-downlink signal path. In other words, the first signal path 222 can carry uplink signals received from the modem 210 via the first modem port 212, and the first signal path 222 can direct the uplink signals for transmission via the first donor antenna 232. The first signal path 222 can comprise of a coaxial cable that is connected between the first donor antenna port 233 and the first modem port 212. The first donor antenna 232 can transmit the uplink signals to a base station. In addition, the first signal path 222 can carry downlink signals received from the first donor antenna 232 via the first donor antenna port 233. The first donor antenna 232 can receive the downlink signals from the base station. The first signal path 222 can direct the downlink signals to the modem 210 via the first modem port 212. In one example, the first signal path 222 may not include amplifiers or filters, and a signal is directed on the first signal path 222 to the modem 210 without modification (e.g., without amplification or filtering) of the signal.

In one example, the repeater 200 can include a second signal path 224 communicatively coupled between the second donor antenna port 235 and the second modem port 214. The second signal path 224 can be a downlink-only signal path. Thus, the second signal path 224 can carry downlink signals received from the second donor antenna 234 via the second donor antenna port 235, and the second signal path 224 can direct the downlink signals to the modem 210 via the second modem port 214. Further, the second signal path 224 can include the pre-amplifier 226 to amplify received downlink signals. For example, the pre-amplifier 226 may amplify a received downlink signal to produce an amplified downlink signal, and the amplified downlink signal can be directed on the second signal path 224 to the second modem port 214. The pre-amplifier 226 can be included in the pre-amplification system 205, which can be responsible for providing amplified downlink signals to the modem 210. In other words, the pre-amplifier 226 in the pre-amplification system 205 can perform downlink signal amplification prior to or before a downlink signal reaches the modem 210.

In one example, the second donor antenna 234 can receive a downlink signal from the base station. The downlink signal can be directed onto the second signal path 224. More specifically, the downlink signal can be directed to the pre-amplification system 205, and the pre-amplifier 226 in the pre-amplification system 205 can amplify the downlink signal to produce an amplified downlink signal. The amplified downlink signal can be directed to the modem 210 via the second modem port 214. The modem 210 can modify the amplified downlink signal by performing amplification, filtering, etc. on the amplified downlink signal. In other words, the modem 210 can modify the amplified downlink signal to produce a modified amplified downlink signal. The modem 210 can direct the modified amplified downlink signal to the coaxial cable 218 via the Ethernet port 216 of the modem 210. In other words, the modem 210 can output the modified amplified downlink signal via the Ethernet port 216, and the modified amplified downlink signal can be sent on the coaxial cable 218 to a destination.

In one example, the modem 210 can act as a cellular-to-WiFi converter. For example, the modem 210 can combine a first downlink cellular signal received on the first signal path 222 and an amplified cellular downlink signal received on the second signal path 224 to form a combined downlink signal. The modem 210 can demodulate the combined downlink signal for output to the Ethernet port 216. Alternatively, the modem 210 can demodulate the combined downlink signal for output to a fiber optic port.

In one example, the pre-amplifier 226 can be inserted on the second signal path 224 (e.g., the downlink-only signal path) to be closer to the second donor antenna 234 (e.g., the diversity donor antenna), which can improve a receive sensitivity on the second modem port 214 (e.g., the downlink-only modem port) and thereby improve the receive sensitivity and performance of the modem 210. For example, inserting the pre-amplifier 226 on the second signal path 224 can increase the receiver sensitivity by about 3 dB, thereby allowing a higher data throughput via the Ethernet port 216 of the modem 210. In addition, the insertion of the pre-amplifier 226 on the second signal path 224 can improve a system noise figure (e.g., reduce the system noise figure), thereby improving a performance of the modem 210. Thus, the system noise figure can be improved by amplifying a downlink signal received from the second donor antenna 234 before the downlink signal is received at the modem 210.

In one example, the incorporation of the pre-amplification system 205 in the repeater 200 may not affect a regulatory certification of the modem 210. In other words, the incorporation of the pre-amplification system 205 in the repeater 200 may not require a regulatory recertification of the modem 210. For example, since the pre-amplification system 205 only amplifies downlink signals that are directly routed to the modem 210 and does not amplify uplink signals, which could adversely affect the network, the pre-amplification system 205 does not change the certification of the modem 210. In one example, the modem 210 can be a pre-certified modem, and incorporating the pre-amplification system 205 to the repeater 200 may not affect a certification status of the modem 210. The pre-amplification system can be limited to a selected gain or power level that will not affect the certification status. For example, the pre-amplification system may be limited to a gain of 3 dB or 6 dB. Therefore, the pre-amplification system 205 can serve to increase the receiver sensitivity and reduce the system noise figure, without affecting the certification of the modem 210. Further, the incorporation of the pre-amplification system 205 in the repeater 200 may not affect a network protection for the repeater 200.

In one example, the pre-amplification system 205 for the modem 210 can be unrelated to a repeater. For example, the pre-amplification system 205 for the modem 210 can be incorporated into any type of hardware device having a modem or an integrated modem. The pre-amplification system 205 can serve to amplify (e.g., pre-amplify) signals before the signals are received at the modem 210. As a result, the modem 210 can receive signals that are already amplified, and the modem 210 can perform further processing on amplified signals.

Figure 3:
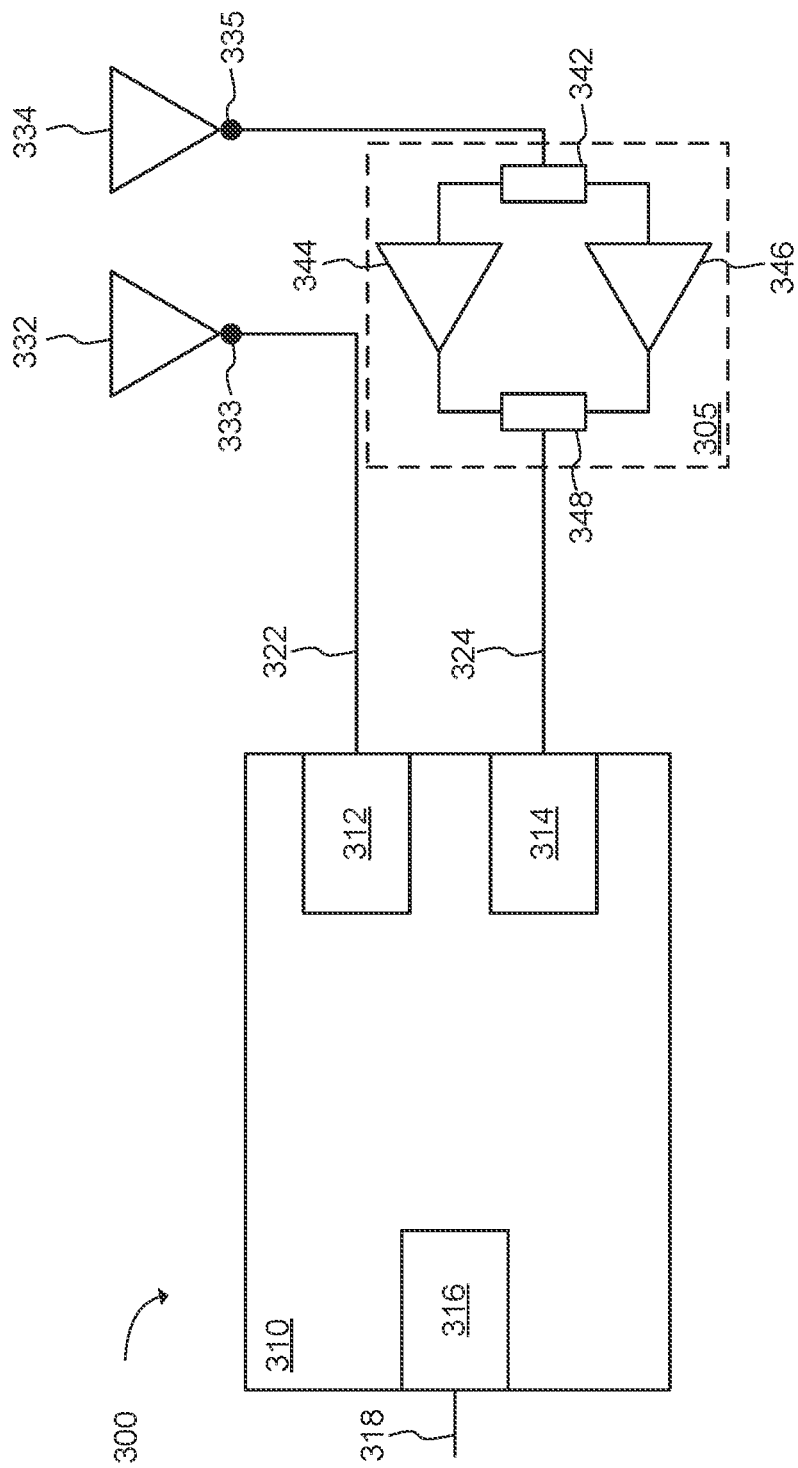
FIG. 3 illustrates another diagram of a repeater that includes a pre-amplification system for a modem in accordance with an example.

FIG. 3 illustrates another example diagram of a repeater 300 that includes a pre-amplification system 305 for a modem 310 (or modem module). The modem 310 can include a first modem port 312 (e.g., an uplink-downlink modem port), a second modem port 314 (a downlink-only modem port) and an Ethernet port 316 communicatively coupled to a destination via a coaxial cable 318. Further, the repeater 300 can include a first donor antenna port 333 communicatively coupled to a first donor antenna 332 (e.g., a main donor antenna), and the repeater 300 can include a second donor antenna port 335 communicatively coupled to a second donor antenna 334 (e.g., a diversity donor antenna). Further, the repeater 300 can include a first signal path 322 communicatively coupled between the first modem port 312 and the first donor antenna port 333, and the repeater 300 can include a second signal path 324 communicatively coupled between the second modem port 314 and the second donor antenna port 335. The first signal path 322 can be an uplink-downlink signal path, and the second signal path 324 can be a downlink-only signal path. In other words, the first signal path 322 can be capable of carrying uplink signals and downlink signals, whereas the second signal path 324 can be capable of carrying only downlink signals.

The pre-amplification system 305 can correspond to the pre-amplification system 205, as described earlier. Further, the second signal path 324 can correspond to the second signal path 224, as described earlier.

In one configuration, the pre-amplification system 305 can be communicatively coupled to the second signal path 324, and the pre-amplification system 305 can be between the second modem port 314 and the second donor antenna port 335. For example, the pre-amplification system 305 can include a first signal modification device 342 and a second signal modification device 348, where the first signal modification device 342 and the second signal modification device 348 can be communicatively coupled to the second signal path 324. The first signal modification device 342 and the second signal modification device 348 can be diplexers, triplexers, splitters, circulators, etc. Further, the pre-amplification system 305 can include a first amplifier 344 and a second amplifier 346, where the first amplifier 344 and the second amplifier 346 can be communicatively coupled between the first signal modification device 342 and the second signal modification device 348. The first amplifier 344 and the second amplifier 346 can be LNAs or another type of amplifier. Further, the first amplifier 344 and the second amplifier 346 can be in parallel with respect to each other.

In one example, the first amplifier 344 can be a high band amplifier and the second amplifier 346 can be a low band amplifier, or vice versa. Thus, a received downlink signal can be directed by the first signal modification device 342 to either the first amplifier 344 or the second amplifier 346 depending on whether the received downlink signal is either a high band signal or a low band signal. In this example, amplifiers can have varying gain across a frequency spectrum, so the first amplifier 344 and the second amplifier 346 can serve to amplify low bands separately from high bands. The high bands can include, but are not limited to, band 4 (B4) or band 25 (B25). The low bands can include, but are not limited to, band 5 (B5), band 12 (B12) or band 13 (B13).

Figure 4A:
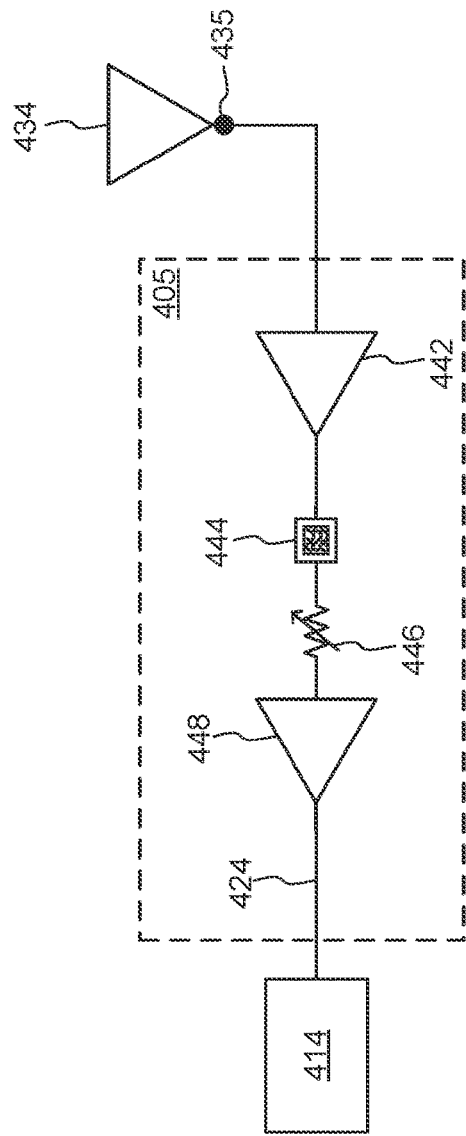
FIG. 4A illustrates a diagram of a pre-amplification system for a modem that includes multiple amplifiers and a band pass filter in accordance with an example.

FIG. 4A illustrates an example diagram of a pre-amplification system 405 for a modem that includes multiple amplifiers and a band pass filter 444. The pre-amplification system 405 can be communicatively coupled to a modem port 414 (e.g., a downlink-only modem port) of the modem (or modem module) via a signal path 424 (e.g., a downlink-only signal path). The signal path 424 can be communicatively coupled to a donor antenna 434 (e.g., a diversity donor antenna) via a donor antenna port 435 (e.g., a diversity donor antenna port). In this example, the pre-amplification system 405 (or the signal path 424) can include an amplifier 442 (e.g., an LNA). In addition, the pre-amplification system 405 (or the signal path 424) can include a band pass filter 444, a variable attenuator 446 and/or an additional amplifier 448. Thus, the amplifier 442, the band pass filter 444, the variable attenuator 446 and/or the additional amplifier 448 can be communicatively coupled between the modem port 414 and the donor antenna port 435. In some cases, the band pass filter 444 can be a single-input single-output (SISO) filter, where the SISO filter can filter signals in one or more bands. Further, the band pass filter 444 can be a low loss filter to protect wideband interference to the modem.

The pre-amplification system 405 can correspond to the pre-amplification system 205, 305, as described earlier. Further, the signal path 424 can correspond to the second signal path 224, 324, as described earlier. Further, the modem port 414 can correspond to the second modem port 214, 314, as described earlier. Further, the donor antenna 434 and the donor antenna port 435 can correspond to the second donor antenna 234, 334 and the second donor antenna port 235, 335, respectively, as described earlier.

Figure 4B:
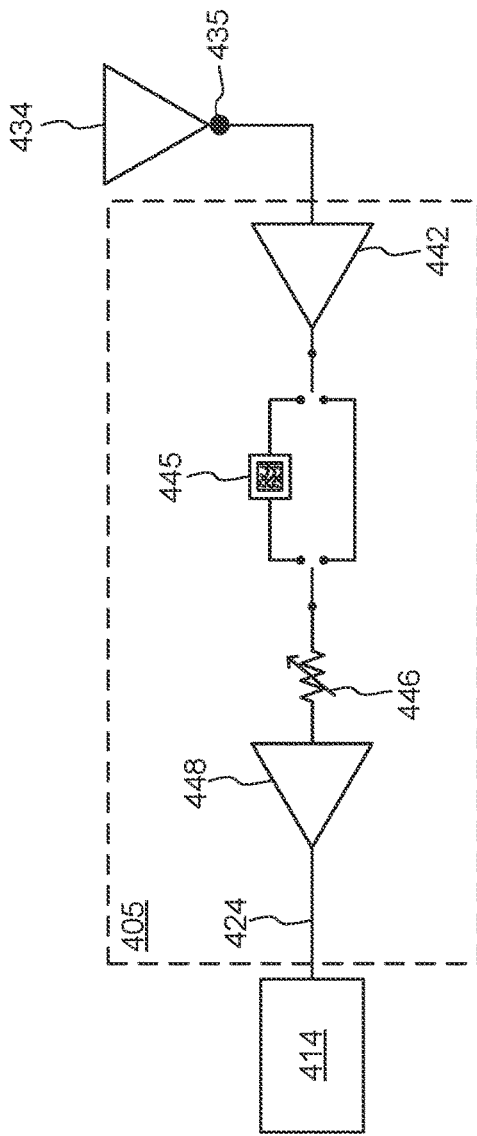
FIG. 4B illustrates a diagram of a pre-amplification system for a modem that includes multiple amplifiers and a switchable band pass filter in accordance with an example.

FIG. 4B illustrates an example diagram of a pre-amplification system 405 for a modem that includes multiple amplifiers and a switchable band pass filter 445. In this example, the pre-amplification system 405 (or the signal path 424) can include a switchable band pass filter 445, as opposed to a non-switchable band pass filter (as shown in FIG. 4A). In one example, bypassing the switchable band pass filter 445 can result in an additional 1-2 dB of receiver sensitivity, thereby improving a performance of the modem.

Figure 4C:
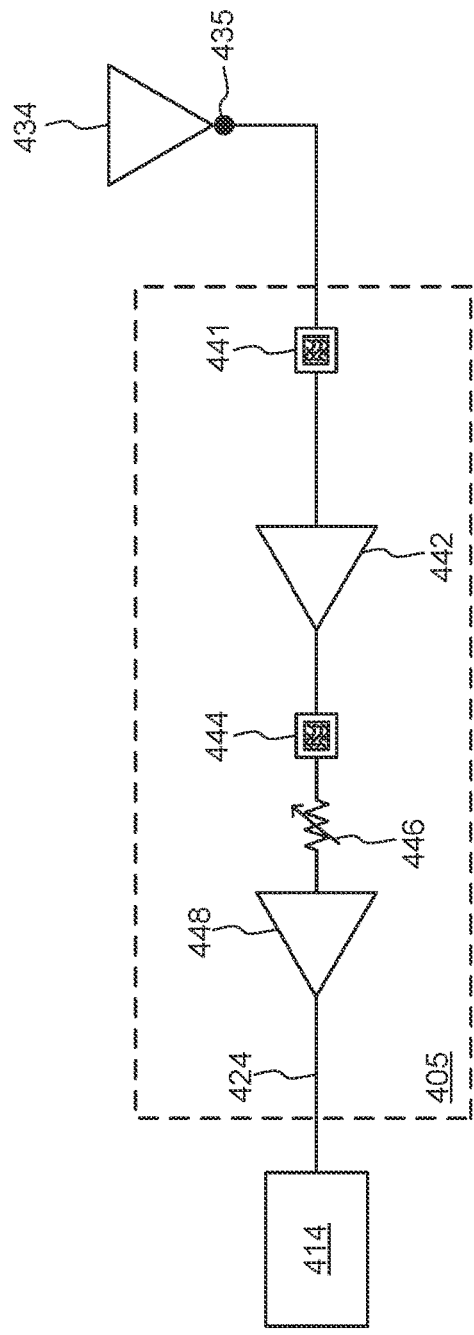
FIG. 4C illustrates a diagram of a pre-amplification system for a modem that includes multiple amplifiers and multiple band pass filters in accordance with an example.

FIG. 4C illustrates an example diagram of a pre-amplification system 405 for a modem that includes multiple amplifiers and multiple band pass filters. In this example, the pre-amplification system 405 (or the signal path 424) can include an additional band pass filter 441 prior to the amplifier 442. In other words, the additional band pass filter 441 can be communicatively coupled between the amplifier 442 and the donor antenna port 435.

Figure 4D:
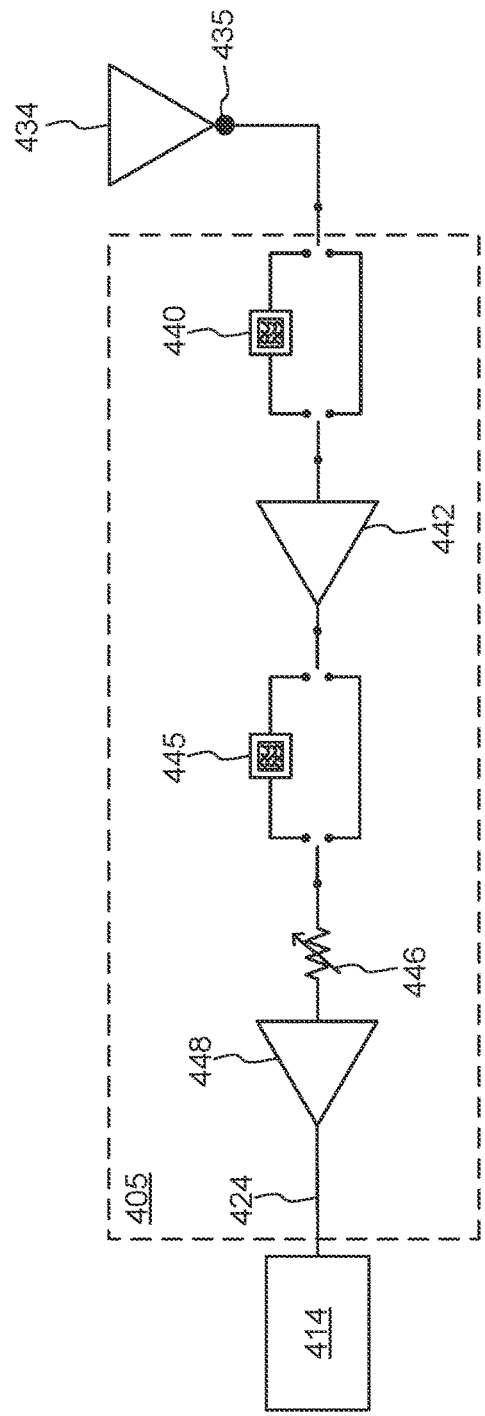
FIG. 4D illustrates a diagram of a pre-amplification system for a modem that includes multiple amplifiers and multiple switchable band pass filters in accordance with an example.

FIG. 4D illustrates a diagram of a pre-amplification system 405 for a modem that includes multiple amplifiers and multiple switchable band pass filters. In this example, the pre-amplification system 405 (or the signal path 424) can include an additional switchable band pass filter 440 prior to the amplifier 442. In other words, the additional switchable band pass filter 440 can be communicatively coupled between the amplifier 442 and the donor antenna port 435.

Figure 5:
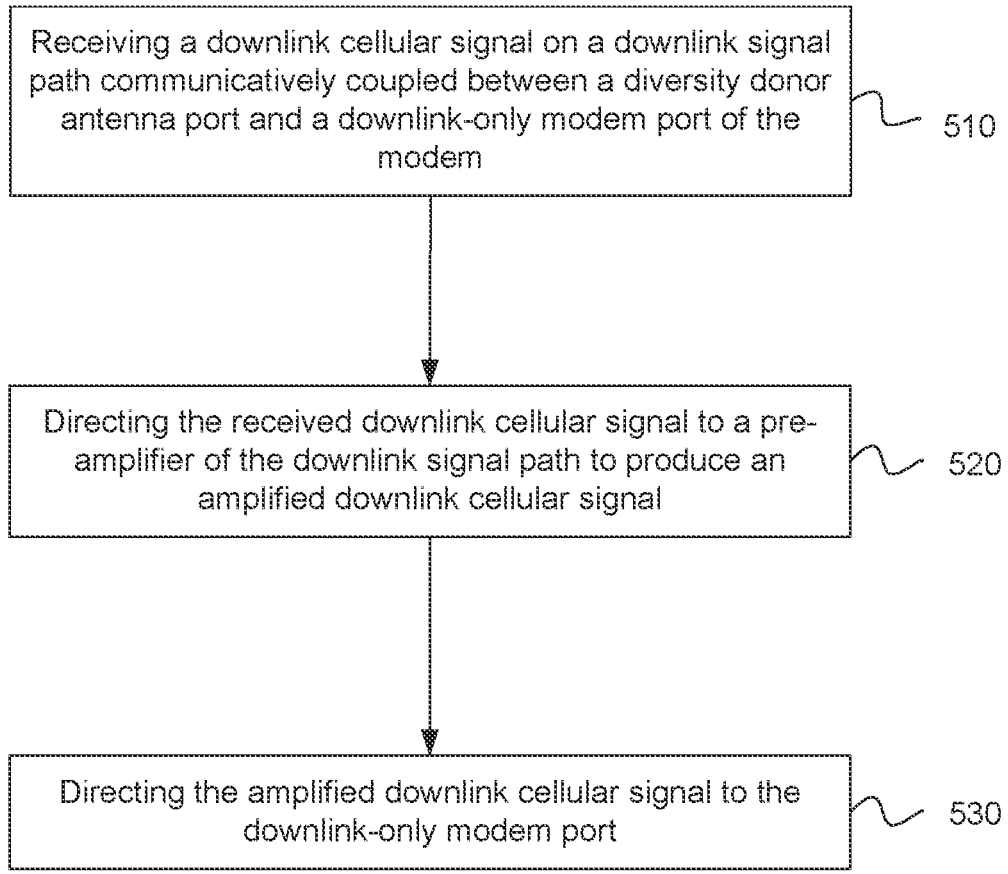
FIG. 5 is a flowchart illustrating operations for pre-amplifying downlink cellular signals for a modem in accordance with an example.

FIG. 5 is a flowchart illustrating a method for pre-amplifying downlink cellular signals for a modem. The method can be executed as instructions on a machine, where the instructions are included on at least one computer readable medium or one non-transitory machine readable storage medium. The method can include the operation of: receiving a downlink cellular signal on a downlink signal path communicatively coupled between a diversity donor antenna port and a downlink-only modem port of the modem, as in block 510. The method can include the operation of: directing the received downlink cellular signal to a pre-amplifier of the downlink signal path to produce an amplified downlink cellular signal, as in block 520. The method can include the operation of: directing the amplified downlink cellular signal to the downlink-only modem port, as in block 530.

Figure 6:
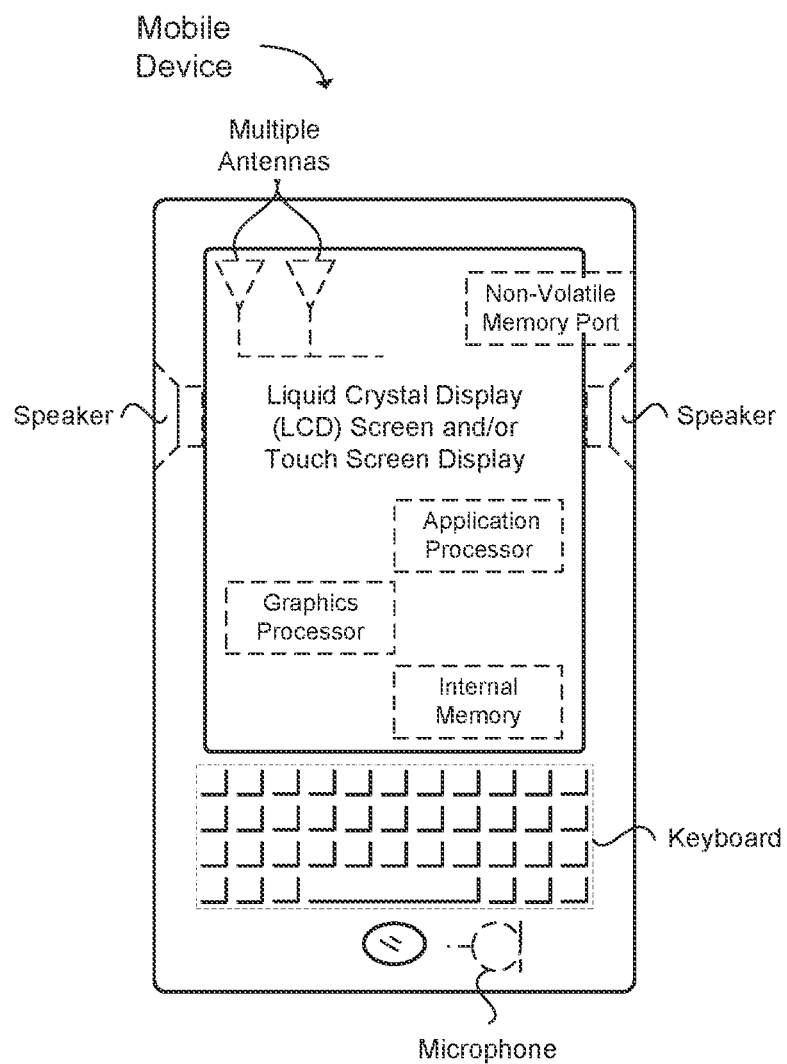
FIG. 6 illustrates a wireless device in accordance with an example.

FIG. 6 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 6 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a system, comprising: a first donor antenna port; a second donor antenna port; a modem comprising a first modem port and a second modem port; a first signal path communicatively coupled between the first donor antenna port and the first modem port, wherein the first signal path is operable to direct a first received cellular signal; and a second signal path communicatively coupled between second donor antenna port and the second modem port, wherein the second signal path includes a pre-amplifier operable to amplify a second received cellular signal to produce an amplified cellular signal to be directed to the second modem port.

Example 2 includes the system of Example 1, wherein: the first modem port is an uplink-downlink port; and the second modem port is a downlink-only port.

Example 3 includes the system of any of Examples 1 to 2, wherein: the first signal path is an uplink-downlink signal path; and the first received cellular signal is a received downlink cellular signal.

Example 4 includes the system of any of Examples 1 to 3, wherein: the second signal path is a downlink signal path; the second received cellular signal is a received downlink cellular signal; and the amplified signal is an amplified downlink signal.

Example 5 includes the system of any of Examples 1 to 4, wherein: the first donor antenna port is communicatively coupled to a first donor antenna; and the second donor antenna port is communicatively coupled to a second donor antenna, wherein the first donor antenna is a main donor antenna and the second donor antenna is a diversity donor antenna.

Example 6 includes the system of any of Examples 1 to 5, wherein the pre-amplifier in the second signal path is a low noise amplifier (LNA).

Example 7 includes the system of any of Examples 1 to 6, wherein the LNA does not necessitate a regulatory recertification of the modem.

Example 8 includes the system of any of Examples 1 to 7, wherein the second signal path includes a band pass filter, wherein the band pass filter is communicatively coupled between the second modem port and the pre-amplifier.

Example 9 includes the system of any of Examples 1 to 8, wherein the second signal path includes a band pass filter, wherein the band pass filter is communicatively coupled between the pre-amplifier and the second donor antenna port.

Example 10 includes the system of any of Examples 1 to 9, wherein the second signal path includes a band pass filter, and further comprising a third signal path between the second modem port and the pre-amplifier that forms a switchable bypass path to bypass the bandpass filter.

Example 11 includes the system of any of Examples 1 to 10, wherein the second signal path includes a variable attenuator.

Example 12 includes the system of any of Examples 1 to 11, wherein the pre-amplifier is a first pre-amplifier, and wherein the second signal path includes a second pre-amplifier communicatively coupled between the second modem port and the first pre-amplifier.

Example 13 includes the system of any of Examples 1 to 12, wherein the second signal path is communicatively coupled to a first signal modification device and a second signal modification device, wherein the pre-amplifier is a first pre-amplifier communicatively coupled between the first signal modification device and the second signal modification device, and the second signal path includes a second pre-amplifier in parallel with the first pre-amplifier and communicatively coupled between the first signal modification device and the second signal modification device.

Example 14 includes the system of any of Examples 1 to 13, wherein: the first signal modification device is one of: a first diplexer, a first splitter or a first circulator; and the second signal modification device is one of: a second diplexer, a second splitter or a second circulator.

Example 15 includes the system of any of Examples 1 to 14, wherein: the first pre-amplifier is a high band pre-amplifier and the second pre-amplifier is a low band pre-amplifier, or vice versa.

Example 16 includes the system of any of Examples 1 to 15, wherein the modem is configured to combine the first received cellular signal and the amplified cellular signal to form a combined downlink signal, and wherein the modem is configured to demodulate the combined downlink signal for output to one of an Ethernet port or a fiber optic port.

Example 17 includes the system of any of Examples 1 to 16, wherein the modem acts a cellular-to-WiFi converter configured to combine the first received cellular signal and the amplified cellular signal to form the combined downlink signal, wherein the combined downlink signal is outputted to one of the Ethernet port or the fiber optic port as a Wi-Fi signal.

Example 18 includes the system of any of Examples 1 to 17, wherein the modem is a modem module that includes an amplifier, wherein the amplifier is a low noise amplifier (LNA), and the pre-amplifier is outside of the modem module and separate from the amplifier in the modem module.

Example 19 includes a pre-amplification system for a modem, the pre-amplification system, comprising: an uplink-downlink signal path communicatively coupled between a first modem port of the modem and a first donor antenna port; and a downlink signal path communicatively coupled between a second modem port of the modem and a second donor antenna port, the downlink signal path including a pre-amplifier configured to amplify a received downlink cellular signal to produce an amplified downlink cellular signal to be directed to the second modem port.

Example 20 includes the pre-amplification system of Example 19, wherein: the first modem port is an uplink-downlink port; and the second modem port is a downlink-only port.

Example 21 includes the pre-amplification system of any of Examples 19 to 20, wherein: the first donor antenna port is communicatively coupled to a main donor antenna; and the second donor antenna port is communicatively coupled to a diversity donor antenna.

Example 22 includes the pre-amplification system of any of Examples 19 to 21, wherein the pre-amplifier is a low noise amplifier (LNA).

Example 23 includes the pre-amplification system of any of Examples 19 to 22, wherein the downlink signal path includes a band pass filter, wherein the band pass filter is: communicatively coupled between the second modem port and the pre-amplifier, or communicatively coupled between the pre-amplifier and the second donor antenna port.

Example 24 includes the pre-amplification system of any of Examples 19 to 23, wherein the downlink signal path includes a band pass filter, and further comprising a switchable bypass path between the second modem port and the pre-amplifier to bypass the bandpass filter.

Example 25 includes the pre-amplification system of any of Examples 19 to 24, wherein the downlink signal path is communicatively coupled to a first signal modification device and a second signal modification device, wherein the pre-amplifier is a first pre-amplifier communicatively coupled between the first signal modification device and the second signal modification device, and the downlink signal path includes a second pre-amplifier in parallel with the first pre-amplifier and communicatively coupled between the first signal modification device and the second signal modification device.

Example 26 includes the pre-amplification system of any of Examples 19 to 25, wherein: the first pre-amplifier is a high band pre-amplifier and the second pre-amplifier is a low band pre-amplifier, or vice versa.

Example 27 includes a method for pre-amplifying downlink cellular signals for a modem, comprising: receiving a downlink cellular signal on a downlink signal path communicatively coupled between a diversity donor antenna port and a downlink-only modem port of the modem; directing the received downlink cellular signal to a pre-amplifier of the downlink signal path to produce an amplified downlink cellular signal; and directing the amplified downlink cellular signal to the downlink-only modem port.

Example 28 includes the method of Example 27, wherein the diversity donor antenna port is communicatively coupled to a diversity donor antenna.

Example 29 includes the method of any of Examples 27 to 28, further comprising: receiving a second downlink cellular signal on an uplink-downlink signal path communicatively coupled between a main donor antenna port and an uplink-downlink modem port of the modem; combining the second downlink cellular signal and the amplified downlink cellular signal to form a combined downlink signal; and demodulating the combined downlink signal for output to one of an Ethernet port or a fiber optic port of the modem.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A pre-amplification system for a modem, the pre-amplification system, comprising:
   an uplink-downlink signal path configured to be coupled between a first modem port of the modem and a first donor antenna port; and
   a downlink signal path configured to be coupled between a second modem port of the modem and a second donor antenna port, the downlink signal path including a pre-amplifier configured to amplify a received downlink cellular signal to produce an amplified downlink cellular signal to be directed to the second modem port;
   wherein the second modem port is a downlink-only port.

2. The pre-amplification system of claim 1, wherein: the first modem port is an uplink-downlink port.

3. The pre-amplification system of claim 1, wherein:
   the first donor antenna port is configured to be communicatively coupled to a main donor antenna; and
   the second donor antenna port is configured to be communicatively coupled to a diversity donor antenna.

4. The pre-amplification system of claim 1, wherein the pre-amplifier is a low noise amplifier (LNA).

5. The pre-amplification system of claim 4, wherein the LNA does not necessitate a regulatory recertification of the modem configured for the pre-amplification system.

6. The pre-amplification system of claim 1, wherein the downlink signal path includes a band pass filter, wherein the band pass filter is: configured to be communicatively coupled between the second modem port and the pre-amplifier.

7. The pre-amplification system of claim 1, wherein the downlink signal path includes a band pass filter, wherein the band pass filter is: configured to be communicatively coupled between the pre-amplifier and the second donor antenna port.

8. The pre-amplification system of claim 1, wherein the downlink signal path includes a band pass filter, and further comprising a switchable bypass path between the second modem port and the pre-amplifier to bypass a bandpass filter.

9. The pre-amplification system of claim 1, wherein the downlink signal path is configured to be communicatively coupled to a first signal modification device and a second signal modification device, wherein the pre-amplifier is a first pre-amplifier configured to be communicatively coupled between the first signal modification device and the second signal modification device, and the downlink signal path includes a second pre-amplifier in parallel with the first pre-amplifier and configured to be communicatively coupled between the first signal modification device and the second signal modification device.

10. The pre-amplification system of claim 9, wherein: the first pre-amplifier is a high band pre-amplifier and the second pre-amplifier is a low band pre-amplifier.

11. The pre-amplification system of claim 9, wherein: the first pre-amplifier is a low band pre-amplifier and the second pre-amplifier is a high band pre-amplifier.

12. The system of claim 1, wherein the downlink signal path includes a variable attenuator.

13. A method for pre-amplifying downlink cellular signals for a modem, comprising:
   receiving a downlink cellular signal on a downlink signal path configured to be coupled between a diversity donor antenna port and a downlink-only modem port of the modem;
   directing the received downlink cellular signal to a pre-amplifier of the downlink signal path to produce an amplified downlink cellular signal; and
   directing the amplified downlink cellular signal to the downlink-only modem port.

14. The method of claim 13, wherein the diversity donor antenna port is configured to be coupled to a diversity donor antenna.

15. The method of claim 13, further comprising:
   receiving a second downlink cellular signal on an uplink-downlink signal path configured to be coupled between a main donor antenna port and an uplink-downlink modem port of the modem;
   combining the second downlink cellular signal and the amplified downlink cellular signal to form a combined downlink signal; and
   demodulating the combined downlink signal for output to one of an Ethernet port or a fiber optic port of the modem.

16. The method of claim 13, wherein the downlink signal path includes a band pass filter, wherein the band pass filter is: configured to be coupled between the downlink-only modem port and the pre-amplifier.

17. The method of claim 13, wherein the downlink signal path includes a band pass filter, wherein the band pass filter is: configured to be coupled between the pre-amplifier and the diversity donor antenna port.

18. The method of claim 13, wherein the downlink signal path includes a band pass filter, and further comprising a switchable bypass path between the downlink-only modem port and the pre-amplifier to bypass a bandpass filter.

19. The method of claim 13, wherein the downlink signal path is configured to be coupled to a first signal modification device and a second signal modification device, wherein the pre-amplifier is a first pre-amplifier configured to be coupled between the first signal modification device and the second signal modification device, and the downlink signal path includes a second pre-amplifier in parallel with the first pre-amplifier and configured to be coupled between the first signal modification device and the second signal modification device.

20. The method of claim 13, wherein the downlink signal path includes a variable attenuator.

* * * * *